April 19, 1960 J. B. WREN ET AL 2,933,169
CLUTCH BRAKE MECHANISM
Filed June 19, 1957 2 Sheets-Sheet 1

WITNESSES
INVENTORS
John B. Wren, Charles W. Irwin
and James H. Penney
BY
ATTORNEY

United States Patent Office 2,933,169
Patented Apr. 19, 1960

2,933,169

CLUTCH BRAKE MECHANISM

John B. Wren and James H. Penney, Amherst Township, Erie County, and Charles W. Irwin, Eggertsville, N.Y., assignors to Westinghouse Electric Corporation, East Pittsburgh, Pa., a corporation of Pennsylvania Application June 19, 1957, Serial No. 666,688

7 Claims. (Cl. 192—18)

This invention relates to dynamoelectric machines provided with clutch brake mechanisms, and more particularly to motor clutch brake mechanisms for driving looms and the like provided with an improved mechanism to prevent undesired clutch engagement of the driven shaft.

Electric motors with clutch brake mechanisms are frequently used to drive looms or other devices which must be stopped and restarted quickly and often. In many known devices of this kind, the driven shaft is equipped with a clutch member which may be moved axially to engage a driving clutch element mounted on the rotor shaft or alternatively to engage a braking surface. A motor of this type is shown and described in copending application Serial No. 535,014, filed September 19, 1955, by James H. Penney and John B. Wren, now Patent No. 2,878,911, assigned to the Westinghouse Electric Corporation. Under certain conditions it is desirable to disconnect the driven shaft from the running motor in such a manner as to leave the driven shaft free to rotate independently of the driving motor shaft. For example, it may become necessary to adjust the work or to service the driven machine. For other reasons, it may become necessary to retain the clutch element of the driven shaft in a neutral position. A stop at the neutral position of the driven shaft serves to prevent accidental engagement of the clutch which could result in injury to the workman or to the driven machine.

The principal object of the present invention is to provide a dynamoelectric machine having an improved clutch brake mechanism wherein a driven shaft can rotate with a driving shaft, be disengaged therefrom to rotate independently of the driving shaft, or be disengaged from the driving shaft and braked.

Another and more specific object of the invention is to provde a motor having an improved clutch brake mechanism for driving a loom or the like wherein a driven shaft can be shifted axially to a position in engagement with a continuously running shaft, to a position out of engagement with a driving shaft and into engagement with a brake or to a neutral position out of engagement with the driving shaft or the brake so that it can be rotated independently of the driving shaft.

Other objects and advantages of the invention will be apparent from the following detailed description taken in connection with the accompanying drawings, in which.

Figure 1:
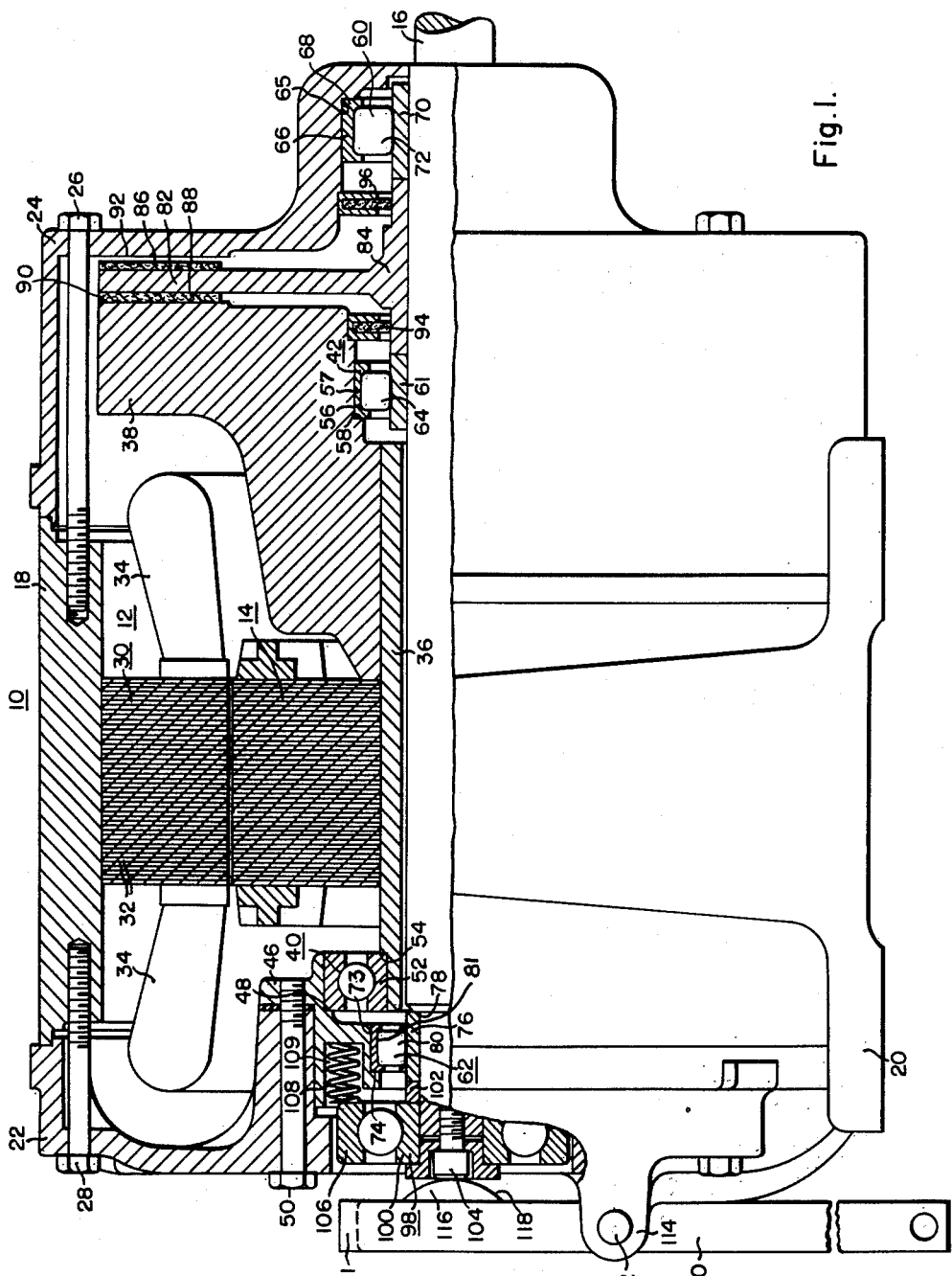
Figure 1 is a side view, partly in section on line I—I of Fig. 2, of a motor with a clutch brake mechanism constructed in accordance with this invention.

The motor assembly shown in the drawings consists of a motor frame 10 in which a stator assembly 12 is mounted. A rotor member 14 is rotatably supported in the motor frame and a clutch and brake mechanism is provided at the right-hand end of the machine as seen in Fig. 1. A mechanism for axially moving the motor shaft 16 to actuate the clutch and brake is provided at the left-hand end of the motor. The motor frame 10 consists of a tubular center section 18 to which mounting feet 20 may be attached if desired. End brackets 22 and 24 having central openings for the motor shaft 16 and the shifting mechanism are attached to each end of the frame 18 by means of a plurality of circumferentially spaced bolts 26 and 28 respectively. Bolts 26 and 28 are held in suitable openings in the frame 18. A stator core 30 comprising a stack of suitable stator laminations 32 having inwardly open slots not shown is mounted in the central portion of the frame 18 by any desired means such as a press fit.

A stator winding 34 of any suitable type is placed in the inwardly opening slots of the stator laminations 32. The rotor member 14, shown as a squirrel cage rotor, is mounted on the outer surface of a hollow rotor shaft 36 by any desired means such as a press fit or the like. Also positioned on the outer surface of the hollow shaft 36 is a flywheel or driving clutch member 38. The clutch member 38 can be attached to the hollow shaft 36 by any desired means such as a press fit or a shrink fit.

The rotor assembly consisting of the rotor 14, the hollow shaft 36 and the clutch member 38 is rotatably mounted in the end bracket 22 by means of a ball bearing 40 at the left-hand end and is supported by a roller bearing 42 at the right-hand end of the clutch member 38. The outer race 44 of the ball bearing 40 is rigidly mounted in a circular opening in a bearing housing 46 by any desired means. The left-hand edge of the outer race 44 bears against an inwardly projecting shoulder 48 formed on the bearing housing 46. Bearing housing 46 is attached to the motor end bracket 22 by means of a plurality of circumferentially spaced bolts 50 which pass through the motor end bracket 22 and are threaded into the bearing housing 46. The inner race 52 of the ball bearing 40 is mounted on a relieved portion of the hollow shaft 36 by any suitable means and the right-hand edge of the race 52 bears against an outwardly projecting shoulder 54 formed on the hollow shaft 36.

The outer race 57 of the roller bearing 42 is mounted in a circular recess in the clutch member 38 by any desired means so that the left-hand edge bears against an inwardly projecting shoulder 58 formed on the clutch member 38. The inner race 61 is rigidly mounted on the motor shaft 16. The motor shaft 16 in turn is rotatably mounted in the end brackets 22 and 24 by means of roller bearings 60 and 62. The rotating anti-friction members 64 of the roller bearing 42 are positioned between the races 57 and 61 respectively and are retained against axial movement in any usual or suitable manner as indicated by an annular groove 56 formed in the race 57. It will be noted that the rotor assembly is supported on the shaft 16 by the bearing 42 but is free to rotate with respect to the shaft when the clutch described hereinafter is disengaged.

The above construction provides a means whereby the rotor assembly of a motor may be rotatably mounted in the motor by means of anti-friction bearings and yet allow for axial movement of the motor shaft 16 to actuate the clutch and brake as described below. The ball bearing 40, in addition to rotatably mounting one end of the rotor assembly, also serves to axially position the rotor assembly in the motor frame 10. This is possible since both the outer race 44 and the inner race 52 of the ball bearing 40 are rigidly mounted in their respective supporting members by means of a press fit or the like and seat against shoulders 48 and 54 respectively and are thus prevented from axially moving. The roller bearing 42 allows axial movement of the inner race 61 without axially moving the outer race 57. Thus both the outer race 57 and the inner race 61 may be securely mounted on their supporting members by a press fit or the like and thus are prevented from moving relative to their respective supporting members. The roller anti-friction members 64 of the bearing 42 are retained in position with respect to the outer race 57 and allow the inner race 61 to move axially.

The motor shaft 16 is rotatably mounted in the end brackets 22 and 24 by means of roller bearings 60 and 62 as previously mentioned. The outer race 66 of the bearing 60 is mounted in a circular recess in the motor end bracket 24 by any suitable or desired means such as a press fit so that the right-hand edge of the race bears against an inwardly projecting shoulder 68 formed on the motor end bracket 24. The inner race 70 of the bearing 60 is attached to the motor shaft 16 by any desired means such as a press fit or the like. The rotating anti-friction rollers 72 of the bearing 60 are positioned between the outer race 66 and the inner race 70 and are prevented from axially moving by any usual means such as retaining ring or annular groove 65. The outer race 73 of the bearing 62 is mounted in a circular recess in the bearing housing 46 by means of a press fit or the like so that its left-hand edge bears against an inwardly projecting shoulder 74 formed in the bearing housing 46. The inner race 76 of the bearing 62 is mounted on the motor shaft 16 by means of a press fit or the like so that its right-hand edge sets against a shoulder 78 formed on the shaft 16. Rotating anti-friction rollers 80 of the bearings 62 are mounted between the outer race 73 and the inner race 76 and are retained against axial movement by any desired means such as a retaining ring or annular groove 81.

Also mounted on the right-hand portion of the shaft 16 between the bearings 42 and 60 is a driven clutch member 82. The driven clutch member 82 is formed integral with the tubular center section 84 which is mounted on the shaft 16 between the inner races 61 and 70 of bearings 42 and 60 by means of a press fit or the like or which might be made integral with the shaft. Attached to both surfaces of clutch member 82 adjacent its outer periphery are suitable friction discs 86 and 88. The friction discs 86 and 88 may be made of any suitable friction material such as ordinary clutch facing material. The friction surfaces 86 and 88 of the driven clutch member 82 bear against annular projecting flat surfaces 90 and 92 formed on the driving clutch member 38 and motor end bracket 24 respectively. The annular surface 90 formed on the clutch member 38 forms the clutch surface of the mechanism and the annular surface 92 formed on the motor end bracket 24 forms the braking surface of the machanism. Grease seals 94 and 96 of any suitable type are mounted in circular openings formed in the clutch member 38 and the end bracket 24 respectively. The grease seals 94 and 96 serve to prevent lubricants escaping from bearings 42 and 60 from flowing into the area surrounding the driven clutch member 82 and thus depositing on the friction facings 86 and 88 so as to reduce their effectiveness.

The above described construction provides for rotatably mounting a motor shaft 16 in the motor so that the motor shaft 16 may be moved through its bearings in the axial direction to alternately engage the clutch surface or the brake surface of the motor clutch-brake mechanism.

A shifting mechanism is provided at the left-hand end of the motor as seen in Fig. 1 to axially shift the motor shaft 16 and thus shift the clutch member 82 to alternately engage the clutch or the brake. The shifting mechanism consists of a ball bearing 98 which is securely attached to the left-hand end of the motor shaft 16 and a shifting lever 110 which is used to move the shaft 16 by applying an axial force to the outer race 106 of the ball bearing 98. The inner race 100 of the ball bearing 98 is securely attached to the shaft 16 by means of a cap screw 104 which threads into the end of the shaft 16 and serves to lock the inner race 100 securely in place against the inner race of the bearing 62, a spacer 102 being used if necessary.

The outer race 106 of the bearing 98 is forced to the left by means of a plurality of circumferentially spaced compression springs 108. The compression springs 108 are mounted in a plurality of circumferentially spaced holes 109 formed in the bearing housing 46 previously described. The shifting lever 110 is pivotally mounted by means of a pin 112, the ends of which are supported in suitable projecting ears 114 formed on the motor end bracket 22. A pair of diametrically opposed projections 116 are provided on the upper end of the shifting lever 110. Each of the projections 116 has a circular outer surface 118 which bears against the outer race 106 of the bearing 98 when the lever 110 is moved to operate the brake.

Figure 3:
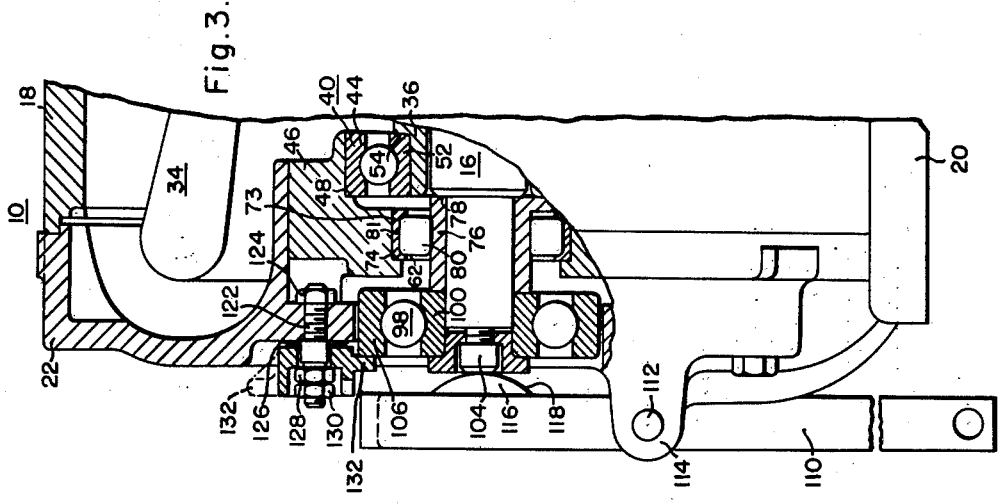
Fig. 3 is a fragmentary view partly in elevation and partly in section on line III—III of Fig. 2.
Figure 2:
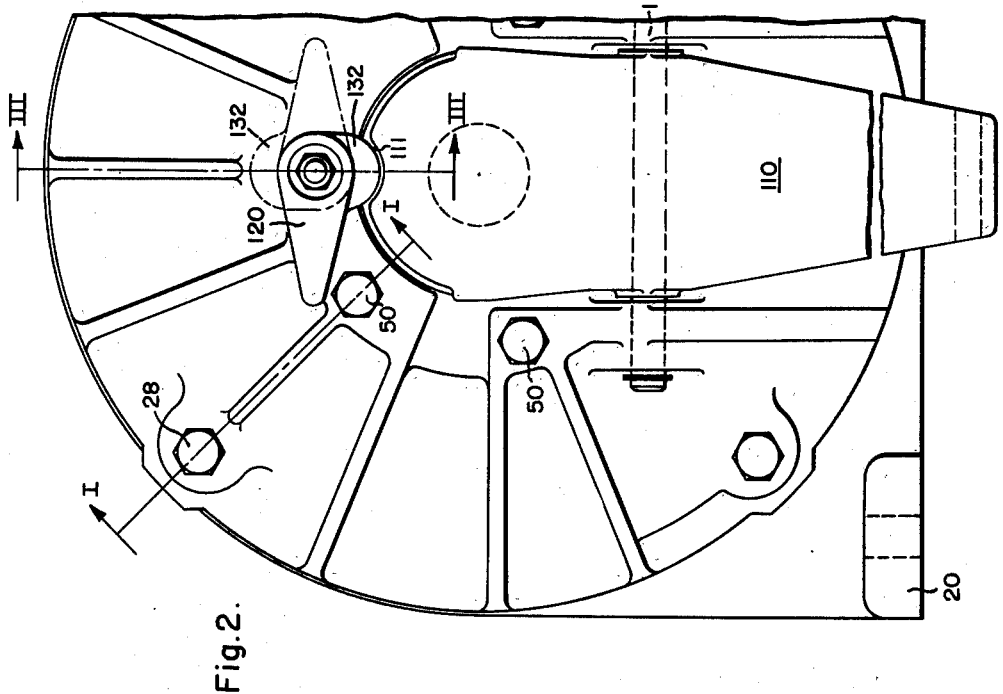
Fig. 2 is a fragmentary end view in elevation showing the operating levers of this invention.

A portion 111 of the upper end of the shifting lever 110 is cut out to expose the outer race 106 of ball bearing 98. This can best be seen in Fig. 2. A safety latch lever 120 is pivotally secured to the end bracket 22 adjacent the upper end of the shifting lever by means of a stud 122 which is threaded into the bracket. A nut 124 is threaded to the stud 122 on the inside of the bracket to lock the stud 122 to keep it from becoming loose. A spring washer 126 is placed on the stud between the bracket and the safety latch lever 120 to keep the lever in a properly adjusted position. The adjusted position of the safety latch lever is attained by threading a nut 128 on the stud 122 outside of the bracket. The spring washer 126 biases the lever outwardly toward nut 128. A second nut 130 is then used to lock the assembly in properly adjusted position. The lever 120 has a lip 132 extending down over the outer race 106 of the bearing 98 as can best be seen in full lines in Fig. 3 when it is in the safe position. The lip 132 in this position engages the outer race 106 of the bearing 78 to hold it in safe positon against the pressure of spring 108. The safety lever 120 is so adjusted that in the "safe" position it will locate the shaft 16 in a position whereby the clutch member 82 lies intermediate the braking surface 92 and the clutch surface 88 out of engagement with the clutch member 38 and the braking surface 92. The safety lever 120 may be rotated 180° to the open position as shown in dotted line in Figs. 2 and 3. In the open position the lip 132 is disengaged from the outer race 106 of bearing 78 and extends radially outward, permitting the springs 108 to force the bearing 98 over until the clutch member 82 engages the clutch and causes the shaft 16 to revolve.

In order to operate the clutch brake mechanism of this invention, the lower end of the shifting lever 110 is moved to the left as seen in Fig. 1. This movement of the shifting lever 110 engages the projections 116 with the bearing race 106 and moves the ball bearing 98 to the right, thus moving the motor shaft 16 axially to the right through the roller bearings. This movement of the motor shaft 16 disengages the clutch element 82 from the clutch surface 90 and engages it with the braking surface 92, thus stopping rotation of the motor shaft 16 and its connected loom or other driven mechanism. The movement of the shifting lever 110 is transmitted through the outer race 106 of the bearing 98 to the inner race 100 and thus to the motor shaft 16. If it is then desired to permit the shaft 16 to rotate independently of the driving shaft, safetly lever 120 is rotated 180° so that the lip 132 overlies and engages the outer race 106 of the bearing 98. This prevents further axial movement of the motor shaft 16 to the left, thus holding the clutch element 82 in a neutral position out of engagement with clutch surface 90. Pressure of spring 108 holds the clutch element 82 out of engagement with braking surface 92. The above motor clutch-brake mechanism is arranged so that the driven clutch element 82 is normally engaged with the clutch surface 90, thus driving the connected loom or other mechanism. It will be apparent, however, that the arrangement could easily be modified so that the clutch element 82 is normally in engagement with the braking surface 92 and would have to be moved to the left to engage the clutch member 82 with the clutch surface 90. It should now be apparent that a motor clutch-brake mechanism has been provided in which the driven shaft can be clutched, braked or held in a neutral position by simple and efficient means. A specific embodiment of the invention has been shown and described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

We claim as our invention:

1. A dynamoelectric machine comprising a stator frame, end brackets secured to said frame, a stator mounted in said stator frame, a rotor member including a hollow rotor shaft mounted for rotation within said stator, a driven shaft disposed within said hollow rotor shaft, a radially extending driving clutch member on said rotor shaft having an annular clutch surface on a face thereof, one of said end brackets having an annular braking surface on a face thereof opposing said clutch surface, a radially extending driven clutch member rigidly mounted on said driven shaft having annular friction surfaces on each face thereof, said friction surfaces disposed intermediate said clutch surface and said braking surface, means for moving said motor shaft axially in said hollow shaft comprising a bearing, the inner race of which is rigidly attached to one end of said motor shaft, the outer race of said bearing being spring biased to move said shaft axially to engage said driven clutch member with said clutch surface, means engaging the outer race of said bearing for moving said motor shaft axially in the opposite direction against said spring bias to disengage said clutch member from said clutch surface and to engage it with said braking surface, and independent means engaging the outer race of said bearing to lock said clutch member in a neutral position intermediate said clutch surface and braking surface.

2. A dynamoelectric machine comprising a stator frame, end brackets secured to said frame, a stator mounted in said stator frame, a rotor member including a hollow rotor shaft mounted for rotation within said stator, a driven shaft disposed within said hollow rotor shaft, a radially extending driving clutch member on said rotor shaft having an annular clutch surface on a face thereof, one of said end brackets having an annular braking surface on a face thereof opposing said clutch surface, a radially extending driven clutch member rigidly mounted on said driven shaft having annular friction surfaces on each face thereof, said friction surfaces disposed intermediate said clutch surface and said braking surface, means for moving said motor shaft axially in said hollow shaft comprising a bearing, the inner race of which is rigidly attached to one end of said motor shaft, the outer race of said bearing being spring biased to move said shaft axially to engage said driven clutch member with said clutch surface, means engaging the outer race of said bearing for moving said motor shaft axially in the opposite direction against said spring bias to disengage said clutch member from said clutch surface and to engage it with said braking surface, and means engaging the outer race of said bearing to hold said clutch member in a neutral position intermediate said clutch surface and braking surface, said last-named means comprising a safety lever pivotally secured to the other of said end brackets, said safety lever having a laterally extending lip, said lip overlying and engaging the outer race of said bearing when in safe position to hold said clutch member in a neutral position.

3. A clutch brake device comprising a hollow rotatable driving shaft carrying a driving clutch member, a driven rotatable shaft axially movable within said driving shaft, an anti-friction bearing axially movable with said driven shaft, a braking surface, a driven clutch member carried by said driven shaft, means cooperating with said bearing to shift said driven clutch member axially into engagement with said driving clutch member, means cooperating with said bearing to shift said driven clutch member into engagement with said braking surface, and means cooperating with said bearing to hold said driven clutch member in a neutral position intermediate said driving clutch member and said braking surface, said last-named means comprising a pivoted safety lever having a laterally extending lip, said lip overlying and engaging said bearing when in safe position to restrain said clutch member in a neutral position, said lip being pivotable to a position out of engagement with said bearing.

4. A clutch brake device comprising a hollow rotatable driving shaft carrying a driving clutch member, a driven shaft rotatable and axially movable within said driving shaft, said driven shaft, a ball bearing axially movable with said driven shaft, a braking surface, a driven clutch member carried by said driven shaft, biasing means cooperating with said ball bearing to urge said driven shaft axially in a direction to engage said driven clutch member with said driving clutch member, means to move said driven clutch member out of engagement with said driving clutch member and into engagement with said braking surface, and means cooperating with said ball bearing to hold said driven clutch member in a neutral position intermediate said braking surface and said driving clutch member, said last-named means comprising a pivoted safety lever having a laterally extending lip, said lip overlying and engaging said bearing when in safe position, said lip pivotable to a position out of engagement with said bearing whereby said driven clutch member may be selectively driven, braked or rotated independently of the driving clutch member.

5. A clutch brake device comprising a hollow rotatable driving shaft carrying a driving clutch member, a driven rotatable shaft axially movable within said driving shaft, a driven clutch member carried by said driven shaft, a braking surface, means to shift said driven clutch member axially into engagement with said driving clutch member, means to shift said driven clutch member into engagement with said braking surface, and means to hold said driven clutch member in a neutral position intermediate said driving clutch member and said braking surface, said last-named means comprising a radially projecting member at one end of said driven shaft, a pivoted safety lever having a laterally extending lip, said lip overlying and engaging said radially extending member when in safe position to hold said driven clutch member in a neutral position, said lip being pivotable to a position out of engagement with said radially extending member.

6. A dynamoelectric machine comprising a stator frame, end brackets secured to said frame, a stator mounted in said stator frame, a rotor member including a hollow rotor shaft mounted for rotation within said stator, a driven shaft disposed within said hollow rotor shaft, a radially extending driving clutch member on said rotor shaft having an annular clutch surface on a face thereof opposing said clutch surface, a radially extending driven clutch member rigidly mounted on said driven shaft having annular friction surfaces on each face thereof, said friction surfaces disposed intermediate said clutch surface and said braking surface, means for moving said motor shaft axially in said hollow shaft comprising a radially extending member attached to one end of said motor shaft, said radially projecting member being spring biased to move said shaft axially to engage said driven clutch member with said clutch surface, means engaging said radially projecting member for moving said motor shaft axially in the opposite direction against said spring bias to disengage said clutch member from said clutch surface and to engage it with said braking surface, and means engaging said radially projecting member to hold said clutch member in a neutral position intermediate said clutch surface and said braking surface, said last-named means comprising a safety lever pivotally secured to the other of said end brackets, said safety lever having a laterally extending lip, said lip overlying and engaging said radially extending member when in safe position to hold said clutch member in a neutral position.

7. A clutch brake device comprising a driving rotatable shaft having a driving clutch member secured thereto for rotation therewith, a driven rotatable shaft having a driven clutch member secured thereto for rotation therewith, a braking surface, first means for moving said driven shaft so as to selectively engage said driven clutch member with said driving clutch member or said braking surface, and second means independent of said first means adapted to be moved from free to safety position to hold said driven clutch member in a neutral position intermediate said braking surface and said driving clutch member and to positively prevent engagement of said driven clutch member with said driving clutch member, said second means including means engaging said driven shaft when said second means is in safe position, whereby said driven clutch member may be selectively driven, braked or rotated independently of the driving clutch member.

References Cited in the file of this patent

UNITED STATES PATENTS

| 1,538,930 | Duplessis | May 26, 1925 |
| 2,546,393 | Hale | Mar. 27, 1951 |
| 2,619,207 | Smith | Nov. 25, 1952 |
| 2,721,279 | Wendel | Oct. 18, 1955 |
| 2,724,470 | Wendel | Nov. 22, 1955 |
| 2,757,766 | McCroskey et al. | Aug. 7, 1956 |
| 2,797,781 | Wendel | July 2, 1957 |